Dec. 29, 1970   R. C. FINK   3,550,204
DIMENSIONAL CONTROL SYSTEM
Filed June 26, 1968   5 Sheets-Sheet 1

INVENTOR.
ROBERT C. FINK
BY
Dominik, Knechtel & Godula
ATTORNEYS

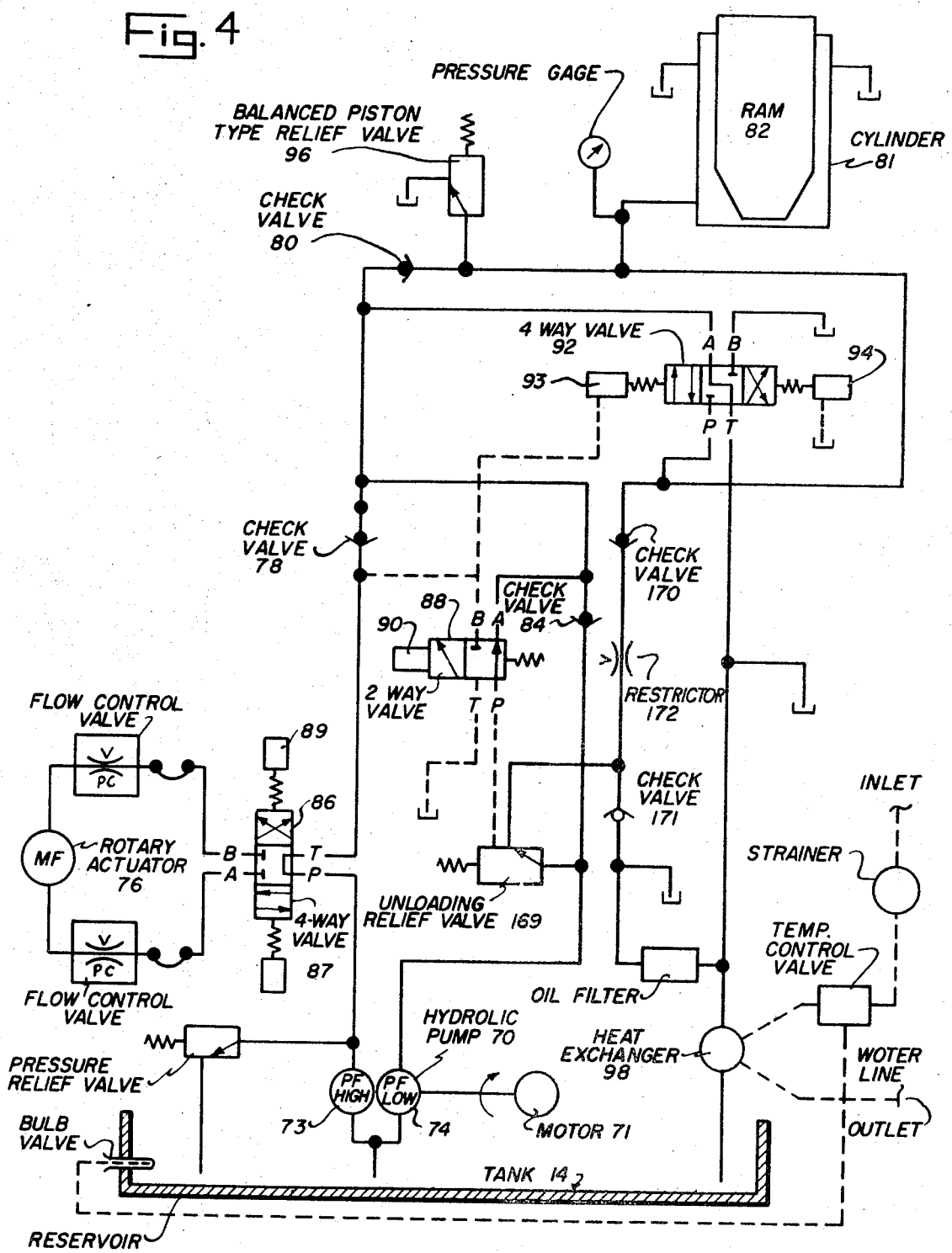

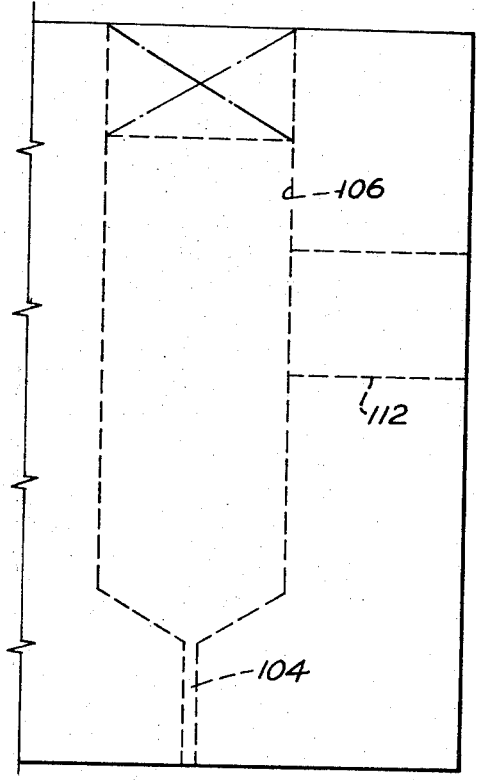
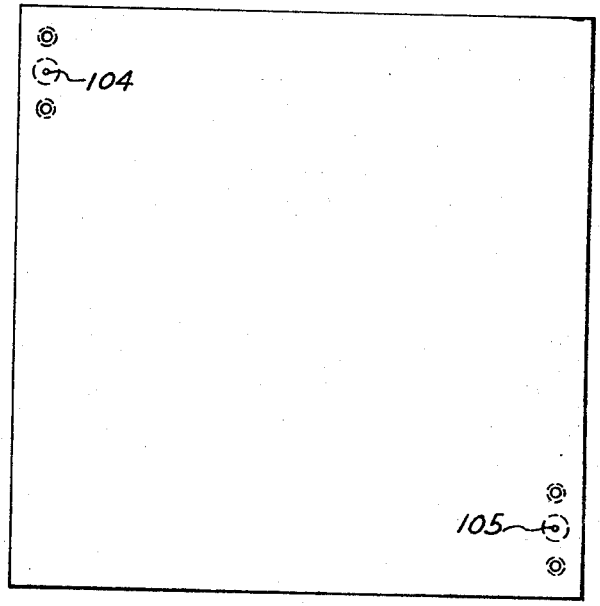
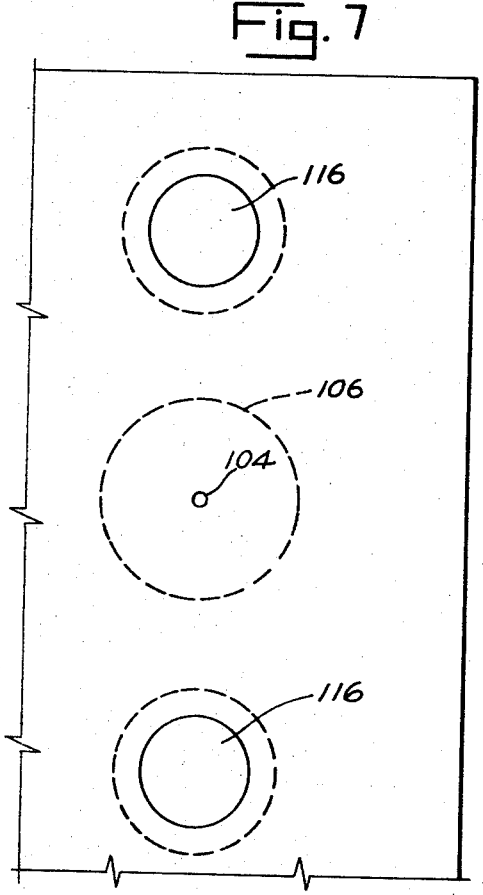
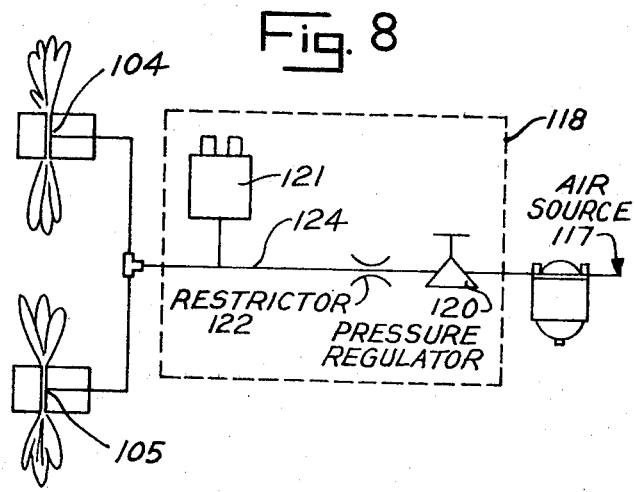

United States Patent Office 3,550,204
Patented Dec. 29, 1970

3,550,204
DIMENSIONAL CONTROL SYSTEM
Robert C. Fink, Chicago, Ill., assignor to Ostrander-Seymour Co., Melrose Park, Ill., a corporation of Illinois
Continuation-in-part of application Ser. No. 448,148, Apr. 14, 1965. This application June 26, 1968, Ser. No. 740,283
Int. Cl. B30b 5/18
U.S. Cl. 18—16      11 Claims

ABSTRACT OF THE DISCLOSURE

A dimensional control system which utilizes a pair of pneumatic orifices which are bored in the movable platen of a press. These orifices are constantly fed pneumatic pressure and the variation in the pressure (in the instant case when the orifices are restricted so as to prevent the further flow of air through them) is read by a gauge which is designed to convert pneumatic signals to electrical signals. The intelligence received by the gauge is then transmitted through appropriate solid state circuitry to drive an electric motor to open or close a discharge valve which bleeds hydraulic fluid off of the pumping system. The operation is such that when the orifices are restricted (closed) the discharge valve, after a pre-set delay, is opened to bleed off sufficient hydraulic fluid from the pumping system to allow the platen to back off a pre-set percentage and to then hold that established pressure until the end of the article forming cycle.

---

This application is a continuation-in-part of U.S. patent application, Ser. No. 448,148, filed Apr. 14, 1965, now Pat. No. 3,401,425.

This invention relates to a dimensional control system for automatically applying pressure to an article, as required, during the forming of said article, to provide uniform and exact dimension to said article in the direction of the applied pressure.

The invention is particularly applicable for controlling presses used in producing plastic matrices and rubber plates for printing, for the effective thickness must not only be held within very close limits during the molding thereof but an exact thickness must be held throughout the area of the mat or plate being molded. The necessity for such exactness in producing plastic matrices and rubber plates for printing is well-known in the graphic arts field. The invention is, as will be apparent from the description which follows, also applicable for controlling other types of presses to apply pressure to an article, in the same fashion. A typical example of the applicability of the dimensional control system of the present invention is its use in controlling the pressure applied to steel stock and the like as it is passed between a fixed and a movable roller, the control being exercised upon a movable roller to automatically adjust its position with respect to the fixed roller.

In U.S. Pat. 3,089,188 issued May 14, 1963 to Otto Hoffman, apparatus is disclosed which is applicable for controlling presses used in producing plastic matrices and rubber plates for printing. The apparatus disclosed therein has two microswitches which are positioned in two opposite corners of the movable platen of the press and are carried by a pivotal arm so as to provide a fine micromatic adjustment. These microswitches control valves in the hydraulic system of the press to, in turn, control the pressure applied by the press to the article during the molding thereof. The operation of the press to provide exact dimensional control is therefore dependent upon the proper operation of the miscroswitches and also the critical adjustment of the pivotal arms upon which they are carried. In operation, it is found that the gases released from the material used in making the plastic matrices and rubber plates permeate the microswitches and form a coating on their contacts which change the operating characteristics of the microswitches. As a result, numerous false signals are generated which adversely affect the operation of the apparatus. In addition, the expansion and contraction of the pivotal arms change the operating characteristics so that exact dimensional control is difficult, if not impossible, to achieve. Also, when these factors are taken into consideration along with the fact that mechanical devices and arrangements are subject to misalignment, wear, frictional disturbances and the like, the apparatus of the Hoffman patent is not as reliable and maintenance-free as the people in the graphic arts fields would like it to be so that uniform and exact dimensional control is assured.

The improved dimensional control system disclosed in the above-mentioned copending application, in its broadest aspect, utilizes a pair of pneumatic orifices which are bored in the movable platen of a press. These orifices are constantly fed pneumatic pressure and the variations in the pressure are read by a gauge which is designed to convert pneumatic signals to electrical signals. The intelligence received by the gauge is then transmitted through appropriate solid stage circuitry to open or close a discharge hydraulic valve which bleeds hydraulic fluid off of the pumping system and thereby regulates the distance between a movable and a fixed platen.

The results produced by this improved dimensional control system are exceptional, and the system has been widely accepted by the industry. However, in some instances, it is found that the production rates are not what they should be and, upon investigating the reason for this, it was found that the employees operating the presses generally have their own opinions on how the press should function. As a result, these employees are constantly readjusting the dimensional control system when, in fact, no readjustment is necessary, so that considerable valuable time is lost. The dimensional control system of the present invention is intended to overcome the above problem, by making the operation of the dimensional control system, and hence the presses, dependent upon factory adjustments. In addition, the system is refined in a fashion such that it is initially set up for use with a particular type of material, to close the press to exert an initial pressure on the article within it and to then back off a certain, fixed percentage. This latter pressure is retained until the press is opened, upon completion of the cycle. No adjustments are necessary as long as the same type of material is being formed and, if a change of material is made, factory or other authorized personnel can adjust the system. In other words, control is taken away from the employee operating the pressure.

It is therefore an object of this invention to provide a new and improved dimensional control system for automatically applying pressure to an article, during the forming of the article, to provide uniform and exact dimension to said article in the direction of the applied pressure. In this respect, it is contemplated that the dimensional control system be fixed for a particular material, so that, under ordinary operating conditions, no adjustments are necessary.

It is a further object of this invention to provide a dimensional control system which is generally capable of providing dimensional control within limits of ±.00005 of an inch.

It is another object of the present invention to provide a dimensional control system wherein the sensing elements are "self cleaning" and therefore are not adversely affected by the gases released from the materials or other foreign matter.

It is still another object of the invention to provide a dimensional control system wherein the sensing elements operate on a pneumatic principle and are therefore virtually maintenance free, are not subject to misalignment and are not subject to wear.

It is a still further object of this invention to provide a dimensional control system which may be adapted to existing apparatus, with a minimum amount of modification and therefore at a relatively small cost.

The above outlined objectives are accomplished with a dimensional control system which utilizes a pair of pneumatic orifices which are bored in the movable platen of a press. These orifices are constantly fed pneumatic pressure and the variation in the pressure (in the instant case when the orifices are restricted so as to prevent the further flow of air through them) is read by a gauge which is designed to convert pneumatic signals to electrical signals. The intelligence received by the gauge is then transmitted through appropriate solid state circuitry to drive an electric motor to open or close a discharge valve which bleeds hydraulic fluid off of the pumping system. The operation is such that when the orifices are restricted (closed) the discharge valve, after a pre-set delay, is opened to bleed off sufficient hydraulic fluid from the pumping system to allow the platen to back off a pre-set percentage and to then hold that established pressure until the end of the article forming cycle.

The invention accordingly comprises the several steps and the relation of one or more such steps with respect to each of the others and the apparatus embodying features of construction, combination of elements and arrangement of parts which are adapted to effect such steps, all as exemplified in the following details disclosure, and the scope of the invention will be indicated in the claims.

For a fuller understanding of the nature and objects of the invention, reference should be had to the following detailed description taken in connection with the accompanying drawings, in which:

FIG. 4 is a block diagram schematic of a hydraulic system exemplary of the present invention, for the press of FIG. 1;

FIG. 5 is a sectional view taken along lines 5—5 of FIG. 6;

FIG. 6 is a plan view of the working surface of the platen of the press of FIG. 1, illustrating the pneumatic orifiices formed therein;

FIG. 7 is an enlarged top plan view of the pneumatic orifice formed in the platen; and FIG. 8 is a block diagram of pneumatic orifices exemplary of the present invention, and its associated circuitry for converting pneumatic pressure signals to electrical signals.

Similar reference characters refer to similar parts throughout the several views of the drawings.

Figure 1:
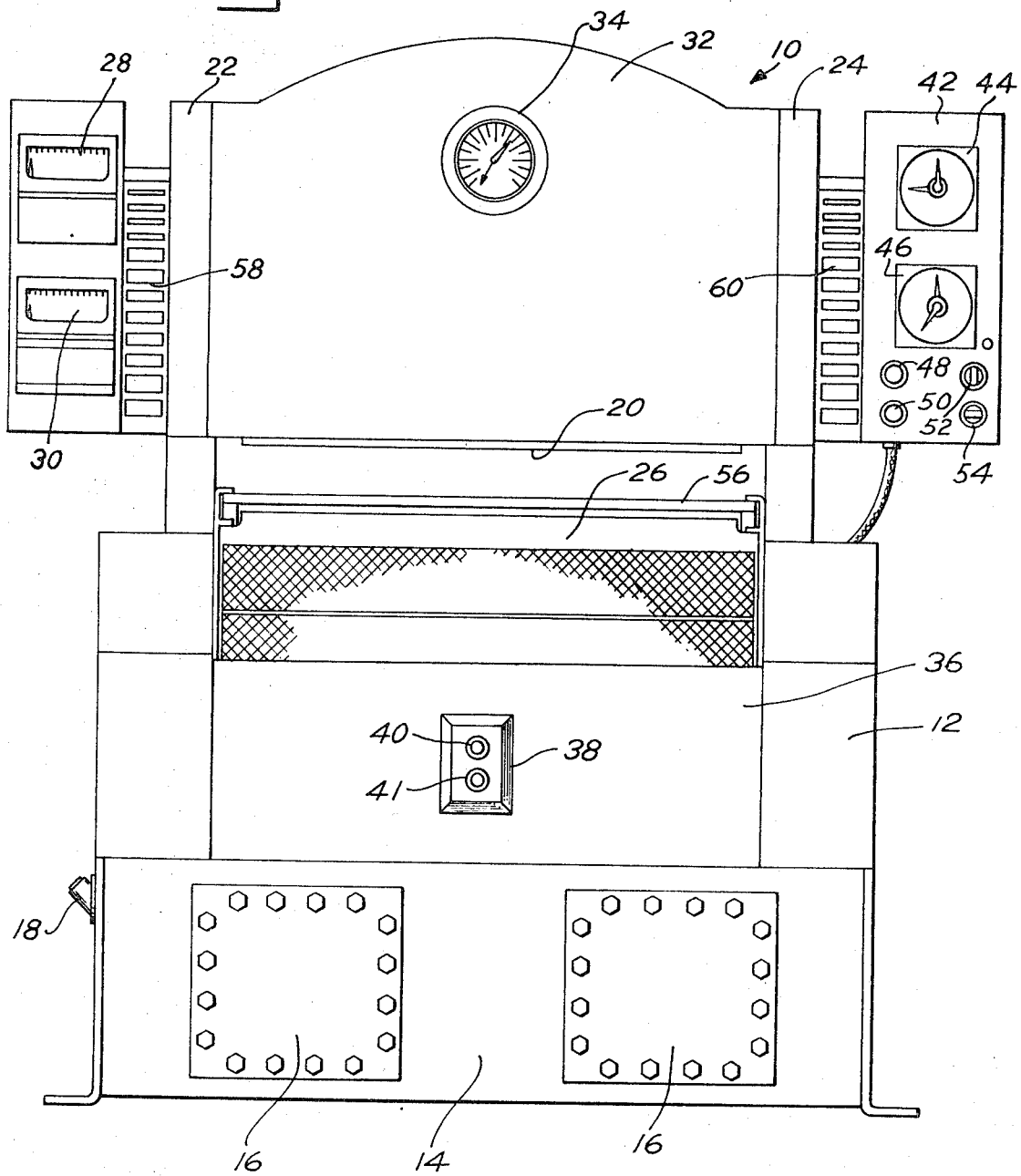
FIG. 1 is a front plan view of a hydraulic press of the type generally used in the graphic arts field.

Referring now to the drawings, in FIG. 1 there is shown a press 10 which is of conventional construction and may be, for example, a press of the type sold under the name of "Moldmaster" by the Ostrander-Seymour Company, of Melrose Park, Ill. Basically, the press 10 has a base 12 between which is an oil tank 14 having two removable clean-out covers 16. An oil tank filler tube 18 is provided for filling the oil tank 14. Press 10 also has a fixed upper platen 20 secured between a pair of upright side rails or plates 22 and 24 and a lower movable platen 26 movably secured within the frame work of the press, in the manner well-known in the art. Both the fixed upper platen 20 and the movable lower platen 26 are bored to provide internal passageways for steam, hot oil or electrical heaters for heating them. A pair of temperature indicators 28 and 30 are provided so that the operating temperature of the platens 20 and 26 are known at all times.

Secured to a top platen cover plate 32 is a hydraulic pressure gauge 34 which is operatively connected to indicate the pressure being applied to an article positioned between the upper and lower platens 20 and 26. Secured to a lower platen cover plate 36 is a motor control box 38 having start and stop buttons 40 and 41. A control unit 42 is secured to the side of the support rail 24 and provides the housing and support for a cure timer control 44, a pre-heat timer control 46, a close push button 48, a return push button 50, an approach selector switch 52 and a preheat stop push button 54.

A work table 56 is supported above the lower movable platen 26 and is adapted to be moved, automatically, into the press in functional working relationship with the platen 26, upon actuation of its control mechanism and to move out of the press upon completion of the molding cycle. Bearers are provided for establishing the desired dimensional thickness for the molded article, in a well-known manner, as well as storage racks 58 and 60 for conveniently storing them when not in use.

Figure 2:
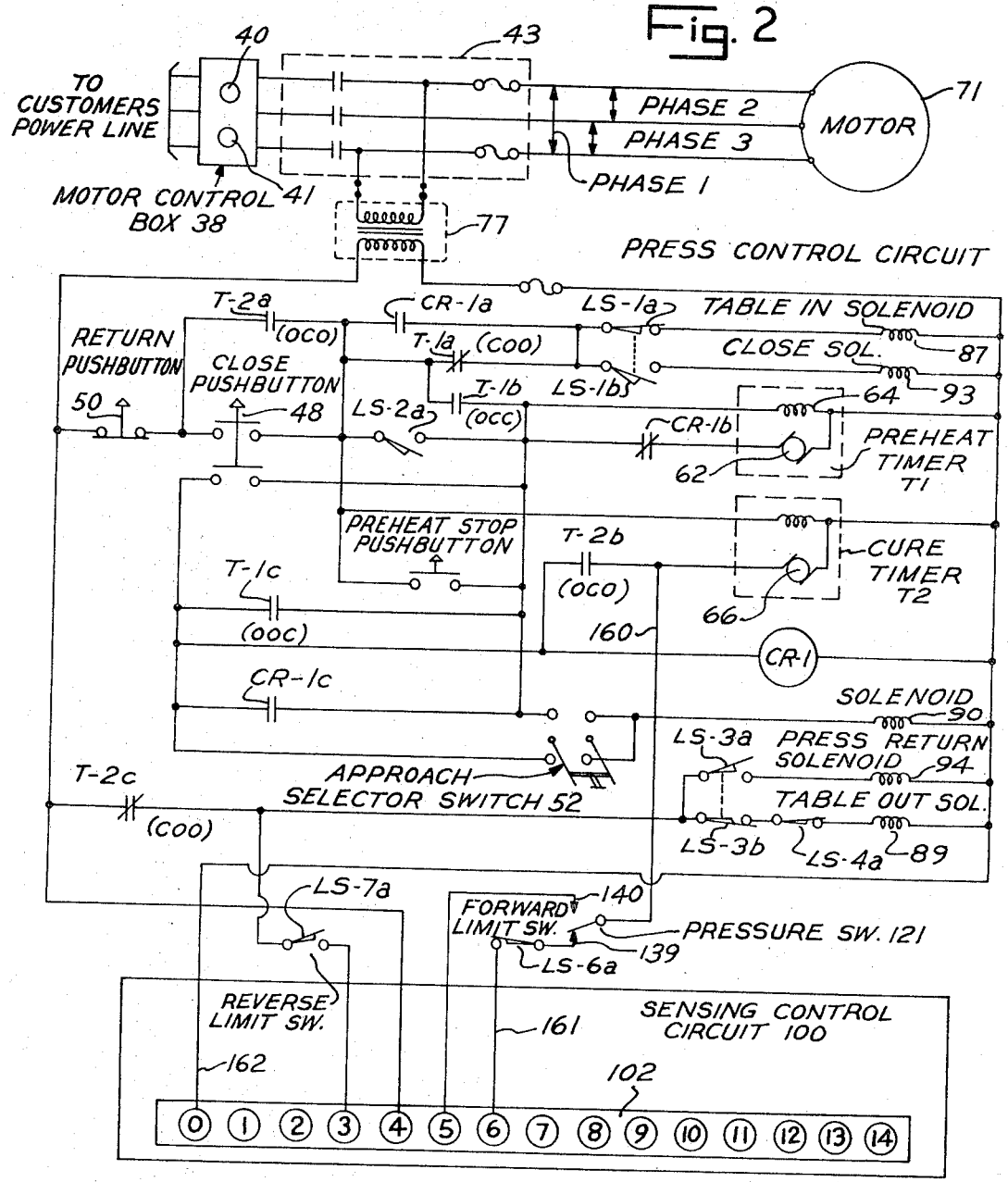
FIG. 2 is a schematic diagram of the control circuitry for the press of FIG. 1.

The operation of the press 10 may be better understood by referring to FIGS. 2 and 4 which show the electrical and hydraulic circuitry of the press, respectively.

The press control circuit 72 includes, as its principal components, a preheat timer T1 which has a timer motor 62, a solenoid 64 and contacts $T-1_a$, $T-1_b$ and $T-1_c$ and a cure timer T2 which likewise has a timer motor 66, a solenoid 68 and contacts $T-2_a$, $T-2_b$ and $T-2_c$. The preheat timer T1 and the cure timer T2 each have three cycles of operation which may be generally referred to as reset, timing and time out. During these cycles of operation, the contacts of the preheat timer T1 and the cure timer T2 are opened and closed in a predetermined fashion. The sequence of operation of each of these contacts is as set forth in the table below:

| Contact: | Reset | Timing | Timed out |
| --- | --- | --- | --- |
| $T-1_a$ | Closed | Open | Open. |
| $T-1_b$ | Open | Closed | Closed. |
| $T-1_c$ | do | Open | Do. |
| $T-2_a$ | do | Closed | Open. |
| $T-2_b$ | do | do | Do. |
| $T-2_c$ | Closed | Open | Do. |

The sequence of operation is also indicated in parentheses below each of the contacts in abbreviated form; the C indicating closed and the O representing open. The operation of the pre-heat timer T1 is generally as follows: its contacts are normally in the reset state and when the solenoid 64 is energized the contacts are operated to the timing state and will remain in this state until the timer motor 62 is energized and the pre-established timing cycle has elapsed or the solenoid 64 is de-energized; when the timer motor 62 is energized, the contacts will operate to the timed out state at the end of the established time cycle; and upon de-energization of the solenoid then return to the reset state. The cure timer T2 operates in a similar fashion.

The press control circuit also includes a number of limit switches LS–1 having contacts $LS-1_a$ and $LS-1_b$; LS–2 having a contact $LS-2_a$; LS–3 having contacts $LS-3_a$ and $LS-3_b$; LS–4 having a contact $LS-4_a$; a forward limit switch having a contact $LS-6_a$; and a reverse limit switch having a contact $LS-7_a$. The limit switch LS–1 is engaged and operated by the work table 56 when it is properly positioned within the press. The limit switch LS–2 is engaged and operated by the work table 56 when it is properly positioned within the press. The limit switch LS–2 is engaged and operated by the work table 56 when it is vertically raised within the press to a predetermined level which is generally referred to as the preheat level. The limit switch LS–3 is engaged and operated by the movable platen 26 as it is moved from its static position within the press to prevent the table from being damaged due to premature raising of the movable platen 26. The limit switch LS–4 is engaged and actuated by the work table 56 when it is fully withdrawn from the press. The forward limit switch and the reverse limit switch are operated by a pair of cams (not shown) affixed to a shaft of a relief valve 96 fully described below, to control the operation of the press 10, under certain operating conditions.

The approach selector switch 52 provides three modes of operation for the raising of the movable platen 26, in a manner set forth in detail below.

The hydraulic circuitry of the press 10 is shown schematically in FIG. 4 and includes as one of its principal components a hydraulic pump 70 driven by the motor 71. The hydraulic pump 70 is actually a dual pump having a high pressure-low volume pump 73 and a low pressure-high volume pump 74. The output of the high pressure-low volume pump 73 is passed through a four way valve 86 having solenoids 87 and 98 which may be referred to as the table in and the table out solenoids, respectively. Solenoids 87 and 89 operate in a manner described more fully hereinafter to control the flow of hydraulic fluid to a rotary actuator 76 to, in turn, control the movement of the work table 56 into and out of the press 10. The output of the high pressure-low volume pump 73 is also passed through a check valve 78 which is adapted to provide a pilot pressure to, under certain circumstances, by-pass some of the hydraulic fluid to a two way valve 88 having a solenoid 90 for controlling its operation, and through another check valve 80 to the cylinder 81 of the press 10 to raise and lower the ram 82.

The output of low pressure-high volume pump 74 is passed through a check valve 84 and joined with the output of the high pressure-low volume pump 73 upstream of the check valve 78 so that both pumps deliver into a single conduit to the cylinder 81 of the press 10.

A four way valve 92 having solenoids 93 and 94 is included upstream of the junction of the outputs of the two pumps 73 and 74, between the check valves 78 and 80 for by-passing the outputs back to the oil tank 14 to control the raising and lowering of the ram 82 of the press 10.

A balanced piston type relief valve 96 coupled between the check valve 80 and the cylinder 81 is provided to control the constant pressure exerted on a work piece within the press 10, by bleeding hydraulic fluid from the supply fed to the cylinder 81. As explained more fully hereinafter, the valve 96 is automatically controlled to provide uniform and exact dimensional control of the workpiece, by means of a reversible, variable speed, direct current motor which is, in turn, controlled by a sensing control circuit 100.

The above described solenoids 87, 89, 90, 92, 93 and 94 are coupled in the circuitry of the press control circuit 72 and are energized in the manner described below to operate their associated valves to control the operation of the press 10. Also, additional components which are not specifically described above are included in the hydraulic circuitry shown in FIG. 5. Many of these components are provided in accordance with good practice in designing hydraulic circuitry to prevent overheating, build-up of pressure and the like while others are included to provide a particular mode of operation which is described in greater detail below.

The operation of the press control circuit 72 and the hydraulic circuitry of FIG. 4 may be generally described as follows. Upon energization of the press 10, by operating the start button 40 on the motor control box 38, the press control circuit 72 is energized through the transformer 77 and the motor 71 is energized through the starter circuit 43. When motor 71 is energized to drive the hydraulic pump 70 and before the operation of the press 10 is initiated, the output of the high pressure-low volume pump 73 is by-passed around the valve 86 and is caused to flow through the valve 92 and the heat exchanger 98, back to the oil tank 14. The output of the low pressure-high volume pump 74 flows through the check valve 84 and joins with the output of the high pressure-low volume pump 73 and is likewise returned to the oil tank 14 through the valve 92.

To initiate operation of the press 10, the close push button 48 of the press control circuit 72, which is a momentary operating push button, is depressed to close a circuit from one side of the transformer 77 through the normally closed return push button 50, the close push button 48, contact T–$1_a$, contact LS–$1_a$ of limit switch LS–1 (not shown) to energize the table in solenoid 87 of valve 86. Upon operating solenoid 87, the output of the high pressure-low volume pump 73 flows through valve 86 to operate the lever acting type rotary actuator 76 which in turn, controls the mechanical mechanism for transporting the work table 56 into the press 10. Fluid forced out of the rotary actuator 76 flows through the valve 86, the check valve 78, the valve 92 and the heat exchanger 98, back to the oil tank 14.

Momentarily operating the close push button 48 also closes a circuit to energize the solenoid of the cure timer T2 to operate its contact T–$2_a$ to close a hold circuit to maintain the table in solenoid 87 of valve 86 operated, after the close push button 48 is released. Contacts T–$2_b$ and T–$2_c$ also are operated to a closed position and an open position, respectively.

When the work table 56 is in its operative position within the press 10, the work table engages and operates the limit switch LS–1 to open its contact LS–$1_a$ to open the energizing circuit for the table in solenoid 87 of valve 86, and at its contact LS–$1_b$ to close an energizing circuit for the close solenoid 93 of valve 92. Upon operating the close solenoid 93, the fluid pumped from the oil tank 14 by the hydraulic pump 70 is forced to flow through check valve 80 to the cylinder 81 of the press 10 to raise the ram 82 and hence the lower movable platen 26. It may be noted that the fluid pumped by both the high pressure-low volume pump 73 and the low pressure-high volume pump 74 of the hydraulic pump 70 are both delivered to the cylinder 81 and the ram 82 is thereby caused to be raised quite rapidly. The lower movable platen 26 upon reaching a predetermined position engages and activates the limit switch LS–2 (not shown) to close its contact LS–$2_a$ to close an energizing circuit for the solenoid 64 of the preheat timer T1. Solenoid 64 operates contact T–$1_a$ to open the hold circuit for the close solenoid 93 of valve 92; contact T–$1_b$ to close a hold circuit for itself; and contact T–$1_c$ which remains open and therefore has no effect at this time. Assuming that the approach selector switch 52 is in the position shown, that is, in an open position, solenoid 90 of valve 88 is not operated at this time and the fluid from the hydraulic pump 70 is again by-passed through valve 92 back to the oil tank 14. The check valve forward of the line leading to the valve 92 and the conditions established at this time are such that the lower movable platen 26 is maintained in its raised position.

The contact LS–$2_a$, in addition to energizing the solenoid 64 of the preheat timer T1, also activates the timer motor 62 of the preheat timer T1. Motor 62 is a variable timer which can be set to establish a preheat time of 0 to 20 minutes before the preheat timer T1 times out to activate its contacts to continue the automatic operation of the press 10.

After the preheat timer T1 times out and operates its contacts, contact T–$1_c$ closes an energizing circuit for relay CR–1 which, in turn, operates to close its contacts CR–$1_a$, CR–$1_b$ and CR–$1_c$. At its contact CR–$1_a$, an energizing circuit is closed through the limit switch contact LS–1$_b$ to again energize the close solenoid 93 of valve 92 and at its contact CR–1$_b$, opens the energizing circuit for the timer motor 62 of preheat timer T1. With the close solenoid 93 again energized, the fluid pumped by the hydraulic pump 70 is again forced to flow through check valve 80 to the cylinder 81 of the press 10 to raise the lower movable platen 26. Also, when contact T–1$_c$ closes, the timer motor 66 of the cure timer T2 is energized to start the cure timer cycle of the press 10, and the sensing control circuit 100 is energized to control the pressure exerted upon the workpiece between the fixed and movable platen of the press 10.

The sensing control circuit 100, as generally described above, is adapted to operate the motor coupled to the relief valve 96, to open and close the latter to bleed hydraulic fluid from the supply fed to the cylinder 81. The operation is such that the movable platen 26 is raised to exert a pre-established pressure on a workpiece within the press 10, and is then backed off, after a preset delay, so that a pressure which is an established, preset percentage of the initial pressure exerted on the workpiece is exerted upon it. This pressure is maintained until the cure timer T2 times out.

The sensing control circuit 100 is fed intelligence from a pair of sensing devices in the form of pneumatic orifices 104 and 105 formed in the opposite corners of the exposed surface of the upper fixed platen 20 of the press 10. The pneumatic orifices 104 and 105 are formed by drilling a hole 106 approximately 1/8 inch in diameter substantially through the upper platen to approximately 3/8 inch from its working surface. A smaller orifice of approximately 0.078 inch is then extended through to the working surface of the platen 20, to form the pneumatic orifice 104, or 105. The end of the large hole 106 is tapped and plugged. A second hole 112 is drilled into the platen so as to intersect the hole 106, and is tapped to provide a connection for a source of air. On opposite sides of each of the orifices 104 and 105 there are provided two spring loaded plungers 116 which are adapted to engage the bearers (not shown) which are normally placed on the lower movable platen 26 to forcibly press the bearers flat against the surface of the platen.

The orifices 104 and 105 (as best seen in FIG. 8) are supplied air from an air source 117 in constant volume. Included in the coupling between the orifices 104 and 105 and the air source 117 is a control unit 118 for detecting the variations in pressure at the orifice openings and for translating the difference in pressure to electrical signals. The control circuit 118 includes a pressure regulator 120 for controlling air pressure and a restrictor 122 for controlling the rate of flow to the orifices 104 and 105. Also coupled to the supply line 124 is an airlectric transducer or pressure switch 121 having contacts 139 and 140 which detects the pressure at the orifice openings and translates the pressure intelligence to electrical control signals to operate its contacts 139 and 140 to control the operation of the press, in the manner hereinafter described.

Figure 3:
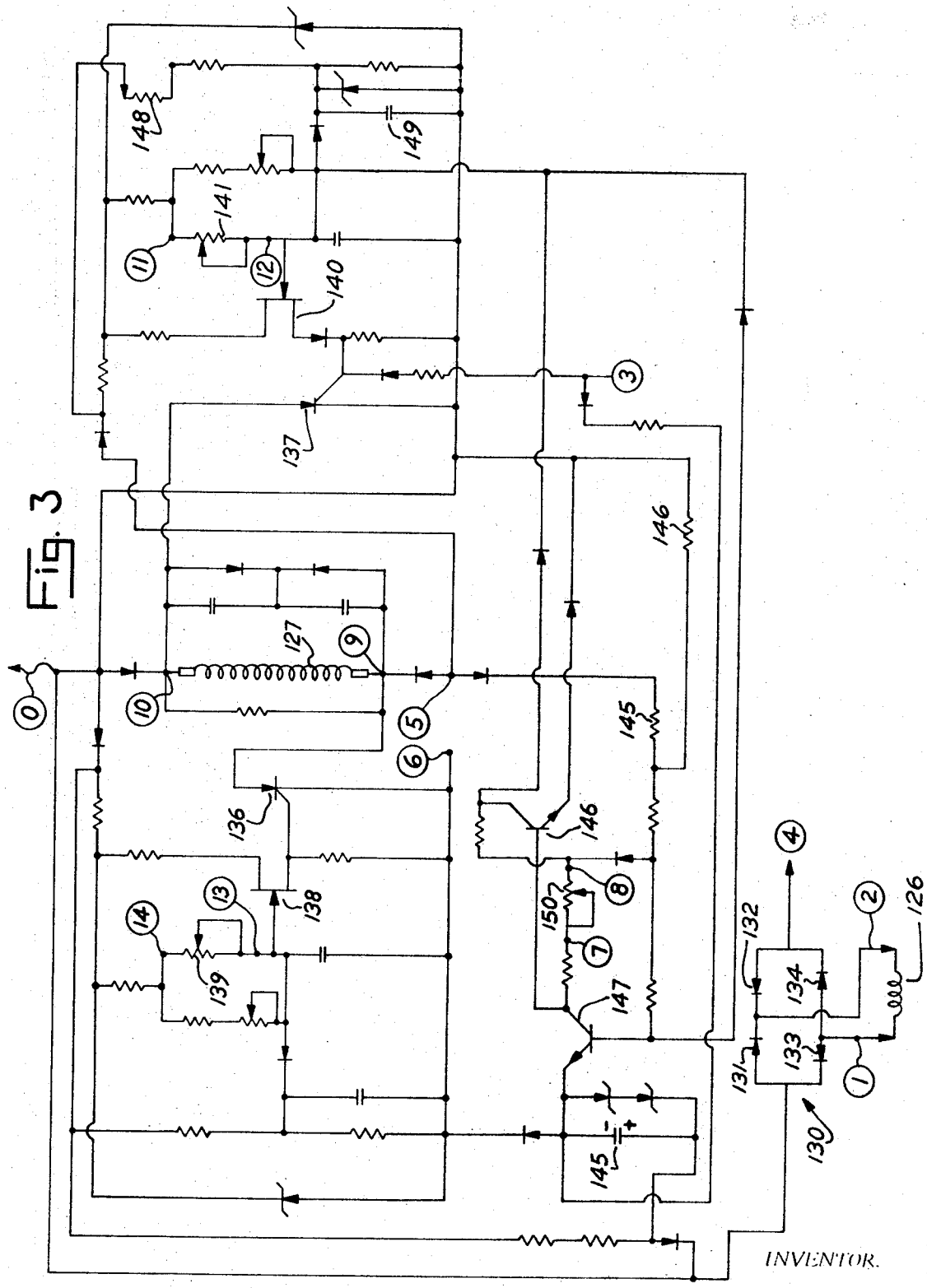
FIG. 3 is a schematic diagram of a sensing control circuit exemplary of the type which can be used to control the press control circuit of FIG. 2.

The motor coupled to the relief valve 96 is shown schematically in FIG. 3, and includes a field winding 126 and an armature 127. Numerous different circuit arrangements can be devised for operating this motor in the above-described fashion, and the circuit arrangement of FIG. 3 is exemplary of a typical "sensing control circuit 100." With this arrangement, it can be seen that the field winding 126 is energized through a diode rectifier bridge 130, including diodes 131–134, which are coupled to terminals 0 and 4 of a terminal block 102 (FIG. 2). These terminals 0 and 4, in turn, are coupled directly to the opposite ones of the output terminals of the transformer 77 which couples power to both the press control circuit 72 and the sensing control circuit 100. It can therefore be seen that the field winding 126 is always energized.

Current flow through the armature 127 of the motor, and hence the direction of rotation of the motor, is controlled by means of the two silicon controlled rectifiers 136 and 137 (hereinafter SCR 136 and SCR 137). The SCR 136 controls the forward rotation of the motor to raise the movable platen 26, and the SCR 137 controls the reverse rotation of the motor to lower the platen. The conduction of the SCR 136 and the SCR 137 are, in turn, controlled as follows.

When the contact T–1$_c$ is closed, in the manner described above, a control signal is coupled through it, contact T–2$_b$, conductor 160, contact 139 of the pressure switch 121, the forward limit switch contact LS–6$_a$ and conductor 161 to terminal 6 of the terminal block 102. As can be best seen in FIG. 2, the conductor 160 is coupled to one output terminal of the transformer 77, and the conductor 162 is coupled to the other one of its output terminals and to the terminal 0 of the terminal block 102. When this control signal is coupled to terminal 6, the SCR 136 is triggered conductive by the unijunction transistor 138 and current flows through the armature 127 of the motor to cause the motor to rotate in the forward direction, to raise the movable platen 26. The speed of the motor is controlled by the potentiometer 139. During the time that the motor is going forward, the capacitor 145 is caused to charge up. The charge on capacitor 145 and the setting of the potentiometer 150 determines the degree or percentage to which the platen 26 is caused to back off to relieve some of the pressure on the work piece within the press 10, as described more fully below.

As the movable platen 26 is raised, the bearers (not shown) which normally are placed on the platen 26 and which are of substantially the same thickness as that desired for the work piece placed on the platen 26 are engaged and forcibly urged flat against the surface of the platen by the spring loaded plungers 116. These bearers are thereby caused to lie flat on the surface of the platen. When the press 10 closes to the point that the bearers close off the air jets from the orifices 104 and 105, a predetermined pressure is being exerted on the work piece. Also, when these air jets from the orifices 104 and 105 are cut off, this deviation in air flow or pressure is detected by the pressure switch 121, and the latter operates to switch the control signal from terminal 6 to terminal 5, at its contact 140.

If the motor is being operated in the forward direction and, for some reason, the platen 26 or the bearers thereon fail to close off the orifices 104 and 105, the press 10 would continue to operate to establish this predetermined pressure on the work piece. To prevent this type of operation, the cam on the relief valve 96 engages and operates the forward limit switch LS–6$_a$ to cut off the control signal from terminal 6. The operator can then restore the press manually, or it will automatically restore when the cure timer T2 times out, as described below.

When the control signal is switched to terminal 5, the SCR 136 is turned OFF so that the motor stops running in the forward direction. The SCR 137 which controls the flow of current through the armature 127 in the reverse direction is prepared to be turned ON, after a preset set delay which is determined by the setting of the potentiometer 148 and the capacitor 149. These two components provide an RC time constant and control the firing of the unijunction transistor 140 which, in turn, triggers the SCR 137 to turn it ON. After this time delay, the SCR 137 is turned ON, and the length of time it remains ON to drive the motor in the reverse direction is determined by the charge on the capacitor 145. This may be generally described as follows. When the control signal is coupled to terminal 5, the transistor 147 which normally is OFF is turned ON, and this permits or causes the capacitor 145 to discharge through transistor 145 to the base of the transistor 146. This latter transistor normally is ON but it is turned OFF by and during the time that the capacitor 145 discharges. When the capacitor 145 is fully discharged, transistor 146 again turns ON and this action, in turn, prevents the SCR 137 from being triggered by the unijunction transistor 140. The motor therefore stops, and remains stopped until the cure timer T2 times out.

When the cure timer T2 times out and operates its contacts, at contact T–2$_a$ the hold circuit for the closed solenoid 93 of valve 92 and the relay CR–1 is opened so that both of them are de-energized. Also, at its contact T–2$_c$, the control signal is coupled to terminal 3 of the terminal block 102 of the sensing control circuit 100, via conductor 163, the reverse limit switch LS–7$_a$ and the conductor 164. As can be seen in FIG. 3, this control signal at terminal 3 directly triggers the SCR 137 at full voltage. Heavy current flow is induced in the armature 127 so that the motor reverses rapidly, to open the relief valve 96 to lower the platen 26. When the cam on the relief valve 96 engages the reverse limit switch LS–7$_a$, it operates the latter to cut off the control signal to terminal 3, and the motor is stopped. An energizing circuit also is closed for the press return solenoid 94 of valve 92, through contact T–2$_c$ and the contact LS–3$_a$ of the limit switch LS–3 (not shown). The latter was operated when the movable platen 26 was raised, to close its contact LS–3$_a$ and to open its contact LS–3$_b$. The press return solenoid 94 of valve 92 conditions the valve 92 so that fluid from the cylinder 81 of the press 10 and the outputs of the hydraulic pump 70 are returned directly to the oil tank 14 so that the movable platen 26 can be rapidly lowered.

When the movable platen 26 is restored to its initial starting position, the limit switch LS–3 is again operated to open its contact LS–3$_a$ to de-energize the press return solenoid 94 of valve 92 and closes its contact LS–3$_b$ to close an energizing circuit through the table out limit switch contact LS–4$_a$ for the table out solenoid 89 of valve 86. Upon actuation of the table out solenoid 89, the flow of fluid to the rotary actuator 76 is reversed so that the mechanical mechanism which controls the movement of the work table 56 is reversed in operation to withdraw the work table 56 from the press 10. When fully withdrawn, contact LS–4$_a$ of the limit switch LS–4 is opened, thereby de-energizing the table out solenoid 89. At this time, the outputs of the hydraulic pump 70 circulates through the valve 92, back to the oil tank 14, in the manner previously described.

The approach selector switch 52, as mentioned above, provides three modes of operation for the raising of the movable platen 26. In each of these modes of operation, the dimensional control circuitry functions in the manner described above and only the operation of the press control circuit 72 and the hydraulic circuitry of FIG. 5 is modified. The other two modes of operation are briefly described below.

When the approach selector switch 52 is operated to close the contacts 167$_a$ and 167$_b$, solenoid 90 of valve 88 is energized at the same time as the solenoid 64 and the timer motor 62 of the preheat timer T1 is energized, rather than after the preheat timer T1 has timed out. It may be recalled that in the latter case, the movable platen 26 was preheat time cycle. When the solenoid 90 of the valve preheat time cycle. When the solenoid 90 of the valve 88 is operated as described above, however, a pilot pressure is established by the check valve 78 to maintain a flow of fluid through the valve 88 to an unloading relief valve 169 which is sufficient to operate it. With the unloading relief valve 169 operated, the output of the low pressure-high volume pump 74 is delivered to the cylinder 81 of the press 10, through a pair of check valves 170 and 171 and a restrictor 172. The two check valves are balanced in a manner such that only a sufficient flow of fluid is permitted which will cause the ram 82, and hence the movable platen 26, to "creep" upwardly. If the platen 26 encounters any pressure, or resistance, the flow of fluid is bled off and returned to the oil tank 14. This mode of operation permits the movable platen 26 to be raised in a "creeping" fashion during the preheat cycle so that upon the completion of the preheat cycle the press, or platen 26 is already positioned for the cure cycle. In cases where the preheat cycle and cure cycle are of short duration, this mode of operation can be used to expedite the operation of the press 10 in forming the article.

When the approach selector switch 52 is operated to close contacts 168$_a$ and 168$_b$, the operation of the press 10 is substantially the same as the first described mode of operation, but solenoid 92 of valve 88 is energized upon completion of the preheat cycle. In this case, the movable platen 26 is raised in a "creeping" fashion, rather than quite rapidly as when the solenoid 92 is not energized. This mode of operation permits the operator to advance, or raise, the movable platen 26 slowly, which in some cases, is very desirable, depending on the type of material being formed.

From the above description, it can be seen that the system of the present invention provides numerous improvements over the system disclosed in the above-mentioned copending application, Ser. No. 448,148 and the sensing means of the above-mentioned Hoffman patent. In that patent, the sensing means are positioned externally of the working surfaces of the platens so that any misalignment of, or inaccuracies in, the bearers will prevent the two platens from being in parallel alignment. With the present invention, since the orifices 104 and 105 are substantially centrally positioned with respect to the surface of the bearers the platens 20 and 26 must of necessity be parallel before the airlectric transducer or pressure switch 121 detects the predetermined established pressure.

The above principle of operation also makes the present invention particularly adaptable to presses of the type having a double, rather than a single, ram platen.

The invention has been described including a hydraulic relief valve for controlling the flow of hydraulic fluid to the press, which valve is, in turn, controlled by a motor. It is apparent, however, that other types of valves can be used in substitute for the relief valve and operated by the sensing control circuit 100. A typical example would be the substitute of an on-off type solenoid directional valve which would control the flow of hydraulic fluid to the cylinder.

It may therefore be noted from the above description that the only pressure applied to the bearers is the low valve found desirable to insure full contact of the bearers with one another and with the platens 20 and 26 between which they are placed plus such pressure as may be required to bring the platens into parallel alignment. It may also be seen that in effect the thickness of the work piece being produced is accurately gauged to within .00005 inch from all corners of the press, by the operation of the dimensional control system detecting the presence or absence of a pressure at the orifices 104 and 105 when the bearers engage the upper platen 20, thereby restricting the air flow from the orifices 104 and 105.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A dimensional control system for automatically applying pressure to an article, as required, during the forming of said article, to provide uniform and exact dimension to said article in the direction of the applied pressure comprising, in combination: a first member; a second member adapted to be adjustably positioned relative to said first member to vary the pressure exerted upon an article therebetween; orifice means formed in a surface which is operatively related to one of said first and second members and in mating relationship to a surface operatively related to the other one of said first and second members; a source of pneumatic pressure coupled to said orifice means, positioning means for adjustably positioning said second member relative to said first member; and control means comprising means for controlling said positioning means to raise said second member relative to said first member to establish a predetermined first pressure on said article, means responsive to the varying pressure at the outlet of said orifice means for controlling said positioning means to lower said second member relative to said first member to exert a second pressure which is a pre-established percentage of said first pressure on said article.

2. The system of claim 1, wherein said control means further includes means for introducing a delay in the operation of said means controlling said positioning means for lowering said second member, whereby said first pressure is exerted on said article for a predetermined period of time.

3. The system of claim 2 wherein said means for introducing a delay is adapted to be adjusted to provide various different time delays.

4. The system of claim 1, wherein said means responsive to the varying pressure at the outlet of said orifice means is operated when the outlet of said orifice means are blocked so as to prevent the flow of pneumatic pressure through them to operate said positioning means to lower said second member relative to said first member to exert a second pressure which is a pre-established percentage of said first pressure on said article.

5. The system of claim 4, further including means operated in response to the operation of said positioning means if said orifice means are not blocked to stop the operation of said means controlling said positioning means to raise said second member with respect to said first member.

6. The system of claim 1, wherein said orifice means comprises a pair of apertures formed in said first member in predetermined spaced-apart relation.

7. A dimensional control system for a hydraulic press having hydraulic means, a fixed platen and a movable platen adapted to be adjustably positioned relative to said fixed platen by said hydraulic means for automatically applying pressure to an article, as required, during the forming of said article, to provide uniform and exact dimension to said article in the direction of the applied pressure comprising, in combination: orifice means formed in said fixed platen, a source of pneumatic pressure coupled to said orifice means, and control means comprising means for controlling said hydraulic means to raise said movable platen relative to said fixed platen to establish a predetermined first pressure on said article, means responsive to the varying pressure at the outlet of said orifice means for controlling said positioning means to lower said movable platen relative to said fixed platen to exert a second pressure which is a pre-established percentage of said first pressure on said article.

8. The system of claim 7, wherein said control means further includes means for introducing a delay in the operation of said means controlling said positioning means for lowering said movable platen, whereby said first pressure is exerted on said article for a predetermined period of time.

9. The system of claim 8 wherein said means for introducing a delay is adapted to be adjusted to provide various different time delays.

10. The system of claim 7, wherein said means responsive to the varying pressure at the outlet of said orifice means is operated when the outlet of said orifice means are blocked so as to prevent the flow of pneumatic pressure through them to operate said positioning means to lower said movable platen relative to said fixed platen to exert a second pressure which is a pre-established percentage of said first pressure on said article.

11. The system of claim 7, further including means operated in response to the operation of said positioning means if said orifice means are not blocked to stop the operation of said means controlling said positioning means to raise said movable platen.

References Cited

UNITED STATES PATENTS

| | | | |
|---|---|---|---|
| 2,381,125 | 8/1945 | Hermann | 18—16 |
| 2,923,973 | 2/1960 | Ninneman | 18—16 |
| 3,082,478 | 3/1963 | Hawkins | 18—17 |
| 3,089,188 | 5/1963 | Hoffmann | 18—16 |
| 3,343,217 | 9/1967 | Danbenberger | 18—16 |
| 3,401,425 | 9/1968 | Fink | 18—16 |

J. HOWARD FLINT, JR., Primary Examiner

U.S. Cl. X.R.

18—17; 60—52